(12) United States Patent
Wentz, Jr. et al.

(10) Patent No.: US 10,139,073 B2
(45) Date of Patent: Nov. 27, 2018

(54) LIGHT EMITTING DIODE (LED) LIGHT BAR

(71) Applicant: Quadratec, Inc., West Chester, PA (US)

(72) Inventors: Theodore H. Wentz, Jr., West Chester, PA (US); Steven M. Fisher, West Chester, PA (US)

(73) Assignee: QUADRATEC, INC., West Chester, PA (US)

( * ) Notice: Subject to any disclaimer, the term of this patent is extended or adjusted under 35 U.S.C. 154(b) by 93 days.

(21) Appl. No.: 14/807,207

(22) Filed: Jul. 23, 2015

(65) Prior Publication Data

US 2017/0023185 A1    Jan. 26, 2017

(51) Int. Cl.
| | |
|---|---|
| *F21S 4/00* | (2016.01) |
| *F21S 43/15* | (2018.01) |
| *B60Q 1/18* | (2006.01) |
| *B60Q 1/32* | (2006.01) |
| *F21V 23/00* | (2015.01) |
| *B60Q 1/26* | (2006.01) |
| *F21S 41/143* | (2018.01) |
| *F21S 41/663* | (2018.01) |
| *F21S 43/14* | (2018.01) |

(52) U.S. Cl.
CPC ............... *F21S 43/15* (2018.01); *B60Q 1/18* (2013.01); *B60Q 1/2611* (2013.01); *B60Q 1/32* (2013.01); *F21S 41/143* (2018.01); *F21S 41/663* (2018.01); *F21S 43/14* (2018.01); *F21V 23/003* (2013.01)

(58) Field of Classification Search
CPC .... F21S 4/26; F21S 4/28; F21S 48/215; F21S 4/00; F21S 4/10; F21S 4/15; F21S 4/20; F21S 4/22; F21S 4/24; F21V 7/005; F21V 7/0083; F21W 2121/04; B60Q 1/18; B60Q 1/24; B60Q 1/245; B60Q 1/2611

USPC ......................................................... 362/221
See application file for complete search history.

(56) References Cited

U.S. PATENT DOCUMENTS

| | | | | |
|---|---|---|---|---|
| 1,995,661 | A | * 3/1935 | Wardwell | F21S 48/1208 362/282 |
| 2,281,643 | A | * 5/1942 | Wahlberg | B60Q 1/0041 362/507 |
| 4,264,944 | A | * 4/1981 | Deverrewaere | F21S 48/155 362/247 |
| 4,583,153 | A | 4/1986 | Tsuyama | |
| 6,109,766 | A | * 8/2000 | Baliozian | F21V 7/0008 362/233 |

(Continued)

OTHER PUBLICATIONS http://www.rigidindustries.com, E-28" Spot/Flood Combo A/W, SKU: 128312AW, downloaded Jul. 23, 2015.
www.quadratec.com, Quadratec Hi Performance 51" LED Comb Light Bar with Wiring Harness, #97109.2405, downloaded Jun. 1, 2015.

(Continued)

*Primary Examiner* — Anh Mai
*Assistant Examiner* — Matthew Peerce
(74) *Attorney, Agent, or Firm* — Caesar Rivise, PC (57) ABSTRACT

A light emitting diode (LED) light bar comprises a housing, a row of a first plurality of LEDs which are next to each other in the housing and are for transmitting light of a first color and at a first power level, a plurality of reflectors surrounding each of the LEDs, and a second plurality of LEDs in the housing at opposite ends thereof. The first plurality of LEDs are electrically connected together. The second plurality of LEDs are electrically connected together independently of the first plurality of LEDs.

19 Claims, 7 Drawing Sheets

(56) References Cited

U.S. PATENT DOCUMENTS

| | | | |
|---|---|---|---|
| 6,601,980 B2* | 8/2003 | Kobayashi | B60Q 1/14 |
| | | | 362/231 |
| 6,657,393 B2* | 12/2003 | Natsume | B60Q 1/26 |
| | | | 315/185 S |
| 6,986,593 B2 | 1/2006 | Rhoads et al. | |
| 7,258,473 B2* | 8/2007 | Okamura | B60Q 1/0052 |
| | | | 362/545 |
| 8,287,144 B2 | 10/2012 | Pedersen et al. | |
| 8,974,102 B2* | 3/2015 | Paine | B60Q 1/0088 |
| | | | 362/544 |
| 9,327,636 B2* | 5/2016 | Wu | F21S 41/19 |
| 9,562,672 B2* | 2/2017 | Jorgensen | F21V 14/06 |
| 2003/0112634 A1* | 6/2003 | Mohri | B60Q 1/2607 |
| | | | 362/487 |
| 2006/0232219 A1 | 10/2006 | Xu | |
| 2008/0259621 A1* | 10/2008 | Peron | B60Q 1/2615 |
| | | | 362/487 |
| 2011/0194287 A1* | 8/2011 | Georgitsis | B60Q 1/0483 |
| | | | 362/277 |
| 2012/0044682 A1* | 2/2012 | Allen | F21V 5/045 |
| | | | 362/241 |
| 2013/0278139 A1* | 10/2013 | Sievers | H05B 33/0821 |
| | | | 315/77 |

OTHER PUBLICATIONS

Federal Motor Carrier Safety Administration—Regulations Section—Part 393, Parts and Accessories Necessary for Safe Operation (18 pages), Sep. 24, 2013.

* cited by examiner

Fig. 1a

| 130 | 131 | 130 |
|---|---|---|
| A/W LED(s) | W LEDs | A/W LED(s) |

FIG. 1b

| 131 | 130 | 131 | 130 | 131 | 130 | 131 |
|---|---|---|---|---|---|---|
| W LEDs | A/W LED(s) | W LED(s) | A/W LED(s) | W LED(s) | A/W LED(s) | W LEDs |

FIG. 1c

| 130 | 131 | 130 | 131 | 130 | 131 | 130 | 131 | 130 |
|---|---|---|---|---|---|---|---|---|
| A/W LED(s) | W LED(s) | A/W LED(s) | W LED(s) | A/W LED(s) | W LED(s) | A/W LED(s) | W LED(s) | A/W LED(s) |

LIGHT EMITTING DIODE (LED) LIGHT BAR

FIELD OF THE INVENTION

The present invention relates to light emitting diodes and specifically, light emitting diodes situated together in housing. In particular, light emitting diodes in a housing include two independently controllable sets of LEDs.

BACKGROUND OF THE INVENTION

LED light bars are known in the art. LED light bars include a plurality of LEDs all arranged in row. The LEDs are situated in a housing and usually have a clear cover to prevent damage from dirt or moisture such as rain or snow. The housing is mounted onto a motor vehicle so that the LEDs illuminate the area in front of the vehicle.

SUMMARY OF THE INVENTION

A light emitting diode (LED) light bar comprises a housing, a row of a first plurality of LEDs which are next to each other in the housing, a plurality of reflectors surrounding each of the LEDs, and a second plurality of LEDs in the housing at opposite ends thereof. The first plurality of LEDs are electrically connected together. The second plurality of LEDs are electrically connected together independently of the first plurality of LEDs.

DETAILED DESCRIPTION

The Federal Motor Carrier Safety Administration (part of the Department of Transportation) issues safety regulations to ensure safe motor carrier operations. Regulations issued by the Federal Motor Carrier Safety Administration are compiled in the U.S. Code of Federal Regulations (CFR). Tittle 49, Section 393.11 of the CFR (incorporated by reference herein) is entitled Parts And Accessories Necessary For Safe Operation—Lamps And Reflective Devices.

Section 393.11 requires that commercial motor vehicles include two clearance lamps. Clearance lamps are required by the Federal Regulations to meet the following specifications:
  a) On each side of the front of the vehicle;
  b) On each side of the vertical centerline to indicate overall width;
  c) Amber color
  d) Both on the same level and as high as practicable.

Further specifications are based on the width of the vehicle and the type of vehicle. Section 393.11 also requires that commercial motor vehicles include three identification lamps. Identification lamps are required by the Federal Regulations to meet the following specifications:
  a) As close as practicable to the top of the vehicle;
  b) On the same level, at the same height, and as close as practicable to the vertical centerline of the vehicle with lamp centers spaced not less than six inches or more than twelve inches apart. Alternatively, the front lamps may be located as close as practicable to the top of the cab;
  c) Amber color Again, further specifications are based on the width of the vehicle and the type of vehicle.

Clearance lights (lamps) and identification lights (lamps) thus are not typically intended to illuminate the area around a vehicle. Rather, in addition to being required by law in certain situations, clearance lights and identification lights typically serve the function of enabling a vehicle to be seen by pedestrians and drivers of nearby vehicles. In situations in which clearance lights and identification lights are not required by law, clearance lights and identification lights may be used to provide a decorative effect, for visibility to other drivers, etc.

A popular accessory for various types of motor vehicles is a light bar. A light bar is typically a single piece assembly with a plurality of illuminating lights, all arranged in a row. The illuminating lights within a light bar may be, for example light emitting diodes (LEDs).

Exemplary light bars are sold by Quadratec and come in a variety of different lengths including (for example) 10 inch, 20 inch, 26 inch and 51 inch. Quadratec light bars include, for example, illuminating lights which are 10 watt LEDs and which are mounted in a die cast aluminum housing. LED light bars are typically mounted on the roof of the vehicle to which they are attached and the light bars are typically oriented so that they are facing towards the front of the vehicle. Quadratec light bars are further described in the Quadratec Essentials Summer 2015 Catalog For Jeep Vehicles which is hereby incorporated by reference.

LED light bars typically include illuminating lights which emit white light for maximum illumination. As a result, the LEDs included in LED light bars typically emit white light. In contrast with clearance lights and identification lights, LED light bars are intended for illuminating an area around (e.g. in front of) the vehicle on which the LED light bar is mounted. LEDs produce lighting patterns of various degrees. For example, a spot light with a 12 degree pattern (for example) may be included. Also, a flood light with a 60 degree pattern (for example) may be included LED light bars may have LEDs which each have the same patterns or may have LEDs which are a combination of two different patterns. LED light bars, however, are not legal for use on public roadways and are intended only for off-road use.

While some owners of motor vehicles desire to include a light bar on their vehicles, those owners may also desire to include identification lights, clearance lights, or both. For non-commercial vehicles, for which clearance lights and identification lights are not required, vehicle owners may enjoy the aesthetic appearance of having identification lights and/or clearance lights on their vehicles. For commercial vehicles—which require identification lights and clearance lights—owners of commercial vehicles may also desire to include a light bar on their vehicles for aesthetic purposes, for the ability to illuminate the area around their vehicles, etc.

Figure 1A:
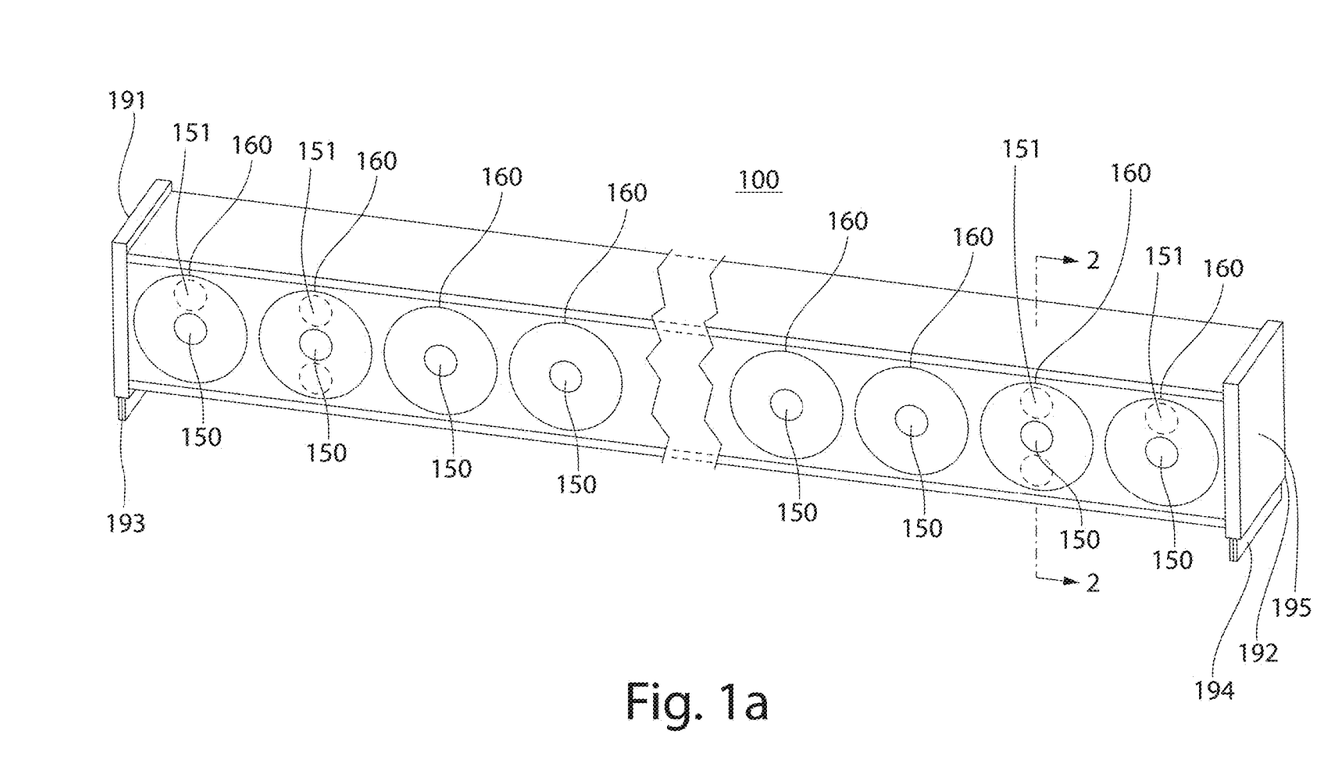
FIG. 1a is a perspective drawing of an LED light bar in accordance with an exemplary embodiment of the present invention.

An exemplary embodiment of the present invention is illustrated in FIG. 1a. Light bar 100 includes housing 110 which may be, for example, comprised for die cast aluminum. It is understood, however, that housing 110 may be comprised of other materials such as other metal, or plastic compounds or polymers. End caps 191, 192 are situated on opposite ends of housing 110. End caps 191, 192 provide structural support to light bar 100, improve the aesthetics of light bar 100, and prevent environmental factors such as rain, snow, wind and dirt from entering into housing 110. A plurality of LED units 140 are situated within housing 110. LED units 140 include LEDs 150, respectively. LEDs 150 are each desirably surrounded by respective reflectors 160. Several LED units 140 include LEDs 151 which are different than LEDs 150—the difference between LEDs 150 and LEDs 151 will be explained below. Clear plastic cover 200 which is comprised of polycarbonate, for example, encloses LEDs 150 and reflectors 160 within housing 110. Couplers 193, 194 extend from the bottom of housing 110 and attach light bar 100 to the vehicle. Attachment of light bar 100 to the vehicle may be via attachment to the roof, attachment to the windshield frame, attachment to the frame using a frame mount light bar, etc.

Light bar 100 is illustrated in FIG. 1a in fragmented form to illustrate that light bar 100 can have any length and number of LEDs. The length and number of LEDs shown in FIG. 1a are merely exemplary.

Electrical cable 195 extends from light bar 100, is connected to a source of electricity, and is used for selectively providing power to LEDs 150 and LEDs 151 as more clearly described below.

In a first exemplary embodiment of the present invention, LEDs 150 are all LEDs of the same color and power usage and may be referred to as illuminating light since their main function is to illuminate the area that they are facing. For example, LEDs 150 are white, 10 watt LEDs and are manufactured, for example, by Cree Lighting. Several LED units 140 include additional LEDs 151. LEDs 151 are a different color than LEDs 150 and a different power usage than LEDs 150. In an exemplary embodiment of the present invention, LEDs 151 are amber with a power usage of one third of a watt.

Figure 1B:
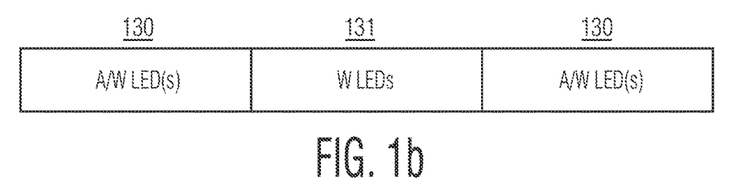
FIGS. 1b, 1c, and 1d are diagrams which illustrate relative position of LEDs in accordance with exemplary embodiments of the present invention.

FIG. 1b illustrates one exemplary embodiment of the present invention in which illuminating lights are included in the center and ends of the light bar 100 and clearance lights are included at the two ends of the light bar 100. In FIG. 1b, light bar 100 includes portions 130 in which LEDs 150 may be energized and LEDs 151 may be energized. Portion 130 includes the legend "A/W LED(s)" to indicate that there are a plurality of LEDs in this section (LEDs 150) that when energized produce a first color (for example white light) and that there are a plurality of LEDs in this section (LEDs 151) that when energized produce a second color (for example amber light). Thus, white light is emitted from portions 130 and 131 of the light bar. This is accomplished by energizing white LEDs 150 that are located in the center(portion 131) of the light bar and white LEDs 150 that are situated on both sides (portion 130) of light bar 100. Amber light and white light (or just amber light) is emitted from the left and right ends of the light bar. Amber light is emitted by energizing the amber LEDs 151 on the left and right ends (portion 130) of the light bar. White light is emitted by energizing the white LEDs 150 on the left and right ends (portion 130) of the light bar. Because of the difference in power between the white LEDs and the amber LEDs, the amber LEDs can be energized when the white LEDs are energized, however, the amber LEDs will not be seen because the light from the white LEDs will overpower the light from the amber LEDs. Alternatively, when white LEDs 150 are energized, amber LEDs 151 may be off.

Put another way, the exemplary embodiment illustrated in FIG. 1b is operated in at least two possible states (or in at least three possible states). In a first state, amber LEDs 151 are emitting light from portions 130 and white LEDs 150 are not emitting light from portion 130 and portion 131. In a second state, white LEDs 150 are emitting light from portions 131 and 130 while amber LEDs 151 are off. In a third state, white LEDs 150 are emitting light from portions 131 and 130 while amber LEDs 151 are on. Thus, in the exemplary embodiment, a user might be permitted to switch between the first state, the second state and the third state. Alternatively, a user might be permitted to switch between the first state and the second. Further alternatively, a user might be permitted to switch between the first state and the third state.

Figure 1C:
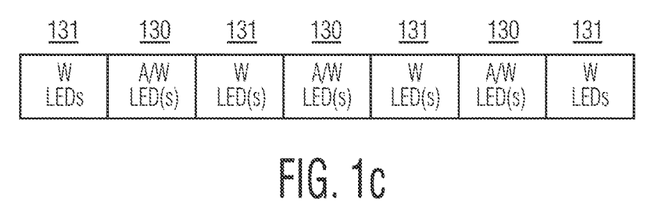

FIG. 1c illustrates another exemplary embodiment of the present invention in which identification lights and illuminating lights are illustrated. As illustrated, amber lighting is interspersed between white lighting. As shown, there are areas 131 in the light bar in which one or more LEDs are emitting white light (W LEDs) and there are areas 130 in the light bar in which one or more LEDs are emitting amber light and/or white light (A/W LEDs). The LEDs at both ends (portion 131) of the light bar are emitting white light.

The exemplary embodiment illustrated in FIG. 1c is operated in at least two possible states (or in at least three possible states). In a first state, amber LEDs 151 are emitting light from portions 130 and white LEDs 150 are not emitting light from portion 130 and portion 131. In a second state, white LEDs 150 are emitting light from portions 131 and 130 while amber LEDs 151 are off. In a third state, white LEDs 150 are emitting light from portions 131 and 130 while amber LEDs 151 are on. Thus, in the exemplary embodiment, a user might be permitted to switch between the first state, the second state and the third state. Alternatively, a user might be permitted to switch between the first state and the second. Further alternatively, a user might be permitted to switch between the first state and the third state.

In a further exemplary embodiment (not shown), the light pattern illustrated in FIG. 1c is used, however, there are additional LEDs, but those LEDs are not energized. For example, although FIG. 1c illustrates LEDs that emit white light at both ends, there may be additional LEDs beyond the illustrated LEDs, and at the ends of the light bar, which are not energized.

Figure 1D:
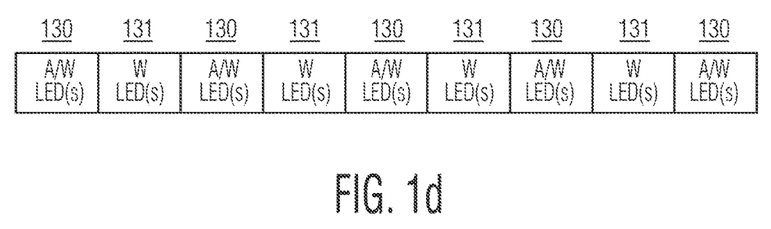

FIG. 1d illustrates another exemplary embodiment of the present invention in which illuminating lights, identification lights, and clearance lights are illustrated. One or more amber LEDs 151 are emitting amber light at both ends (portion 130) of the light bar. White LEDs 150 are also able to emit white light from both ends (portion 130) of the light bar. One or more LEDs 150 are emitting white light along the light bar and away from the two ends. One or more LEDs 151 are emitting amber light at multiple locations and are interspersed with the LEDs 150 which are emitting white light.

The exemplary embodiment illustrated in FIG. 1d is operated in at least two possible states (or in at least three possible states). In a first state, amber LEDs 151 are emitting light from portions 130 and white LEDs 150 are not emitting light from portion 130 and portion 131. In a second state, white LEDs 150 are emitting light from portions 131 and 130 while amber LEDs 151 are off. In a third state, white LEDs 150 are emitting light from portions 131 and 130 while amber LEDs 151 are on. Thus, in the exemplary embodiment, a user might be permitted to switch between the first state, the second state and the third state. Alternatively, a user might be permitted to switch between the first state and the second. Further alternatively, a user might be permitted to switch between the first state and the third state.

Returning again to FIG. 1a, it is possible to energize the LEDs which are shown to provide the exemplary embodiments illustrated in FIGS. 1b, 1c and 1d.

In the examples above, when one white LED 150 is shown, it is possible to instead have a plurality of white LEDs next to each other. Furthermore, when one amber LED 151 is shown, it is possible to instead have a plurality of amber LEDs next to each other.

The above examples have distinguished between LED 150 and LED 151 on the basis of color, i.e. white vs. amber. The basis of distinguishing between the two colors is merely exemplary. The difference between LED 150 and LED 151 may be otherwise in alternative embodiments of the present invention. Exemplary differences between LED 150 and LED 151 can include one or more of any of the following:
 a) One color (i.e. white, amber, or another color) vs. another color (i.e. white, amber, or another color);
 b) One power level vs. another power level;
 c) One illumination pattern vs. another illumination pattern;
 d) One illumination duration (i.e. steady or flashing) vs. another illumination duration (i.e. flashing or steady)
 e) Flashing intervals vs. flashing intervals.

Figure 1E:
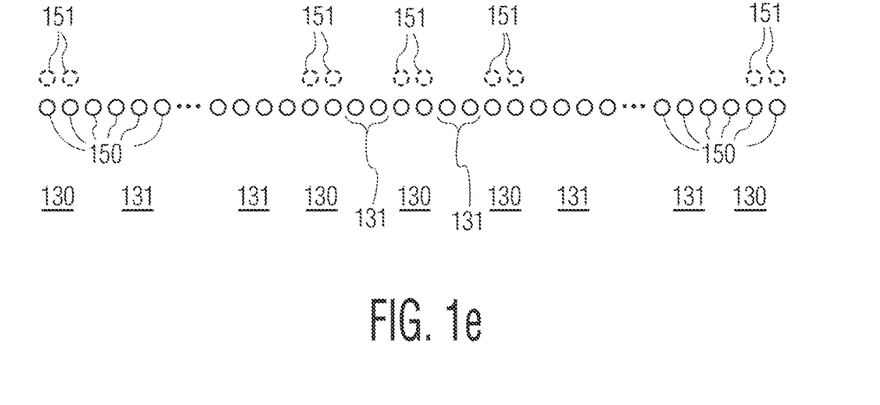
FIG. 1e is a diagram which illustrates relative position of LEDs in accordance with an exemplary embodiment of the present invention.

A further exemplary embodiment of the present invention is illustrated by FIG. 1e. The illustration shown in FIG. 1e corresponds to the illustration shown in FIG. 1d. LEDs 150 are LEDs that emit white light and are situated next to each other along light bar 100. An exemplary number of LEDs are shown to represent LEDs 150, and the number shown may be increased or decreased as desired. Amber LEDs 151 are shown at both ends and function as clearance lights. While two LEDs 151 are shown at each end, the number of LEDs may be increased or decreased as desired. Amber LEDs 151 are shown in three groups near the center and function as identification lights. While amber LEDs 151 are shown in groups of two, the number may be increased or decreased as desired. As explained above, there are numerous states and combinations of the LED's being on and off in various colors. In one exemplary embodiment, energizing of the LEDs is switched between a) amber LED's 150 are on and white LED's 151 are off; and b) amber LED's 150 are on and white LED's 151 are on.

Again, when light bar 100 is being used with a vehicle on a public roadway, LEDs 150 are not permitted to be used. Furthermore, in exemplary embodiments, the identification lights and clearance lights 151 can be turned on or off as desired (as long as they are not turned off contrary to motor vehicle law).

Figure 1F:
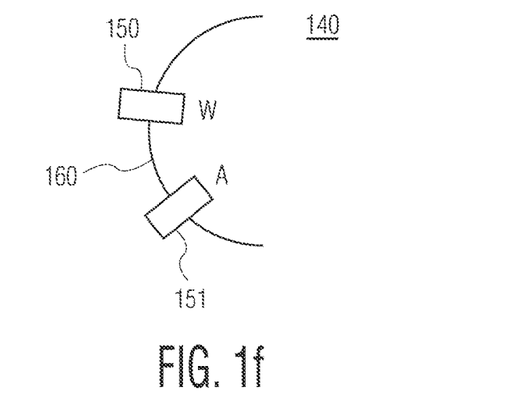
FIG. 1f is a side view which illustrates the use of two LEDs and a reflector in accordance with an exemplary embodiment of the present invention.

FIG. 1f illustrates some of the components which may be found within LED module 140. Reflector 160 includes two openings. In a first opening, LED 150 is placed. LED 150 produces white light and consumes (for example) 10 watts. In a second opening, LED 151 is placed. LED 151 produces amber light and consumes (for example) one third of a watt. The location of LED 150 and LED 151 within reflector 160 is merely exemplary.

Figure 1G:
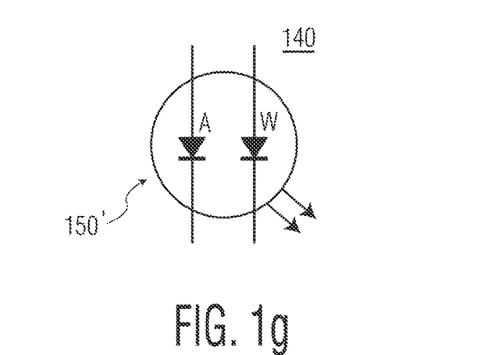
FIG. 1g is a schematic diagram which illustrates the use of a dual color LED in accordance with an exemplary embodiment of the present invention.

FIG. 1g illustrates a further exemplary embodiment of the present invention. In FIG. 1g, LED 150 and LED 151 have been replaced with one LED that produces light of two different colors. In FIG. 1g, an LED is comprised of two diodes. Applying energy to diode A causes diode A to produce amber light. Applying energy to diode W causes diode W to produce white light. Each diode includes its own anode so that each diode may be energized without energizing the other diode (if desired).

Figure 2A:
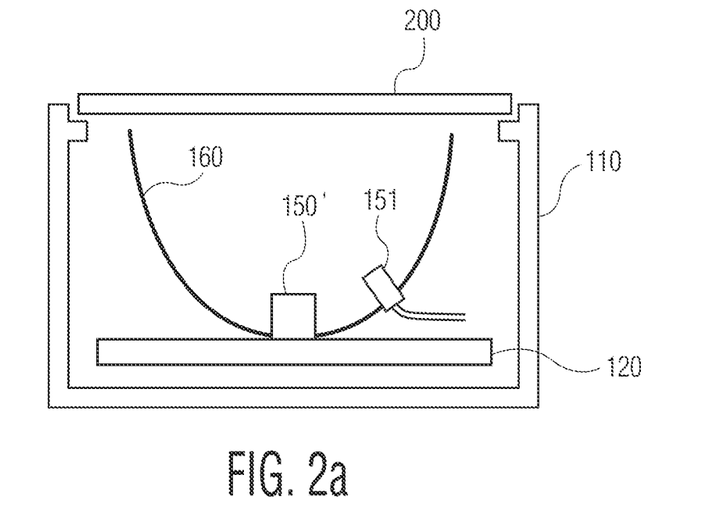
FIG. 2a is a side view along section line 2-2 of FIG. 1a which shows two LEDs and a reflector in a housing in accordance with an exemplary embodiment of the present invention.

FIG. 2a is sectional view along section line 2-2 shown in FIG. 1. LED 150 which produces white light is shown. LED lighting element 150 is situated on substrate 120. Substrate 120 may be a printed circuit board (PCB) with LEDs mounted thereon. Alternatively, metal core PCBs (MCPCB) may be used for increased thermal dissipating efficiency. If MCPCB is used, the MCPCB should desirably have an insulating layer with a thickness to maintain an appropriate resistance so that the metal substrate and the circuit board are electrically isolated from each other. Reflector 160 is situated about LED 150. LED 151 which produces amber light is also shown and is situated in an opening in reflector 160. LED 150, LED 151, substrate 120 and reflector 160 are situated within housing 110. A clear plastic cover 200, comprised of poly carbonate (for example) covers the opening of housing 110 and prevents water and dust from entering into housing 110. Additional components which may be included and which are not shown are one more lenses to focus the light emitted by LED 150, thermal insulation or dissipation members, etc. The structure of LED 150 and substrate 120 may be assembled, for example, in accordance with U.S. application 2010-0103660 which is hereby incorporated by reference.

Figure 2B:
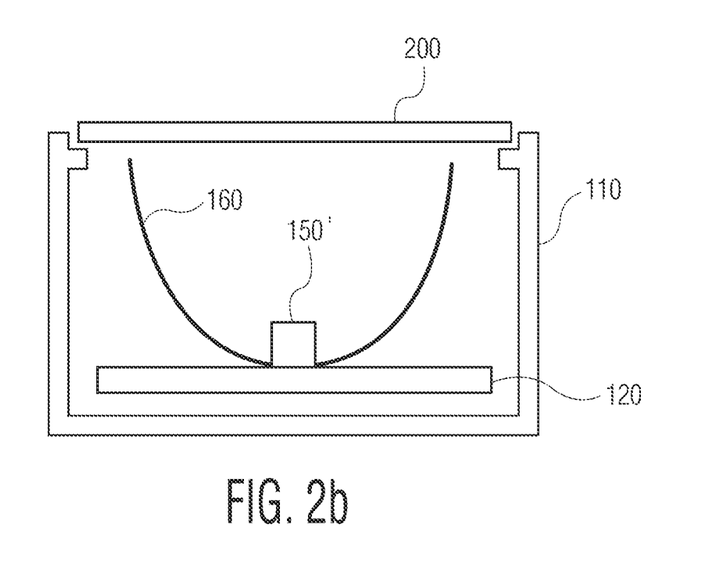
FIG. 2b is a side view which is similar to the side view shown in FIG. 2a but which illustrates a dual color LED and a reflector in a housing in accordance with an exemplary embodiment of the present invention.

FIG. 2b is a sectional view which illustrates a further exemplary embodiment of the present invention. The exemplary embodiment shown in FIG. 2b differs from the exemplary embodiment shown in FIG. 2a in that LEDs 150, 151 which generate light in respectively different colors (and at respectively different power levels) has been replaced with one LED 150' which includes two diodes (which again produce light at two respectively different colors and power levels).

Figure 3A:
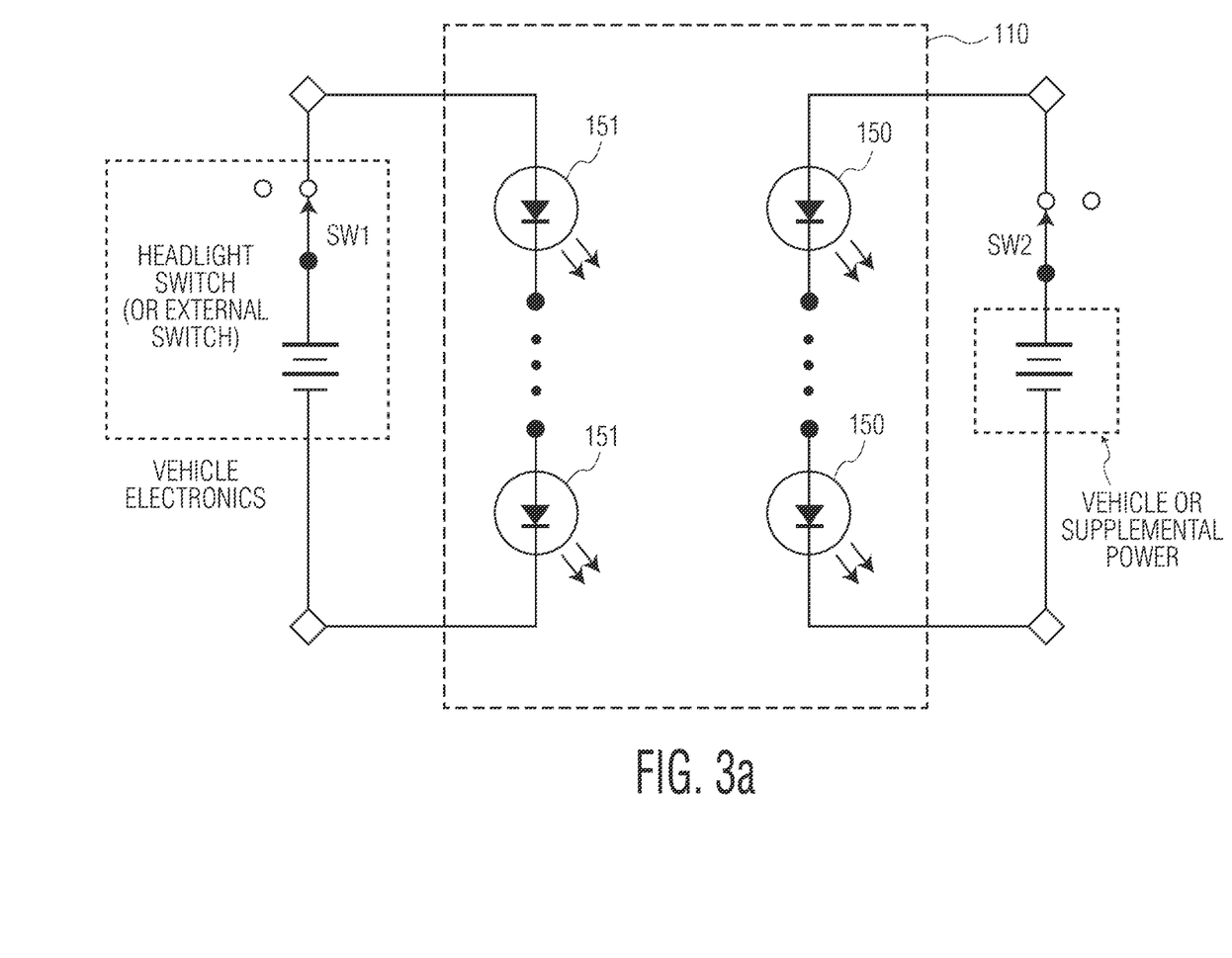
FIG. 3a is a schematic diagram for powering two sets of LEDs in accordance with an exemplary embodiment of the present invention.

FIG. 3a is an exemplary schematic diagram which may be used to implement the lighting pattern shown in FIG. 1e. LEDs 150, 151 are within housing 110. Amber color LEDs 151 have been connected, for example, to the headlight switch (or parking light switch) of a motor vehicle. Thus, when the headlights (or the parking lights) of the vehicle are turned on, amber color LEDs 151 are also turned on. Alternatively, an external switch can be used to actuate amber color LEDs 151. A separate switch is used to energize LEDs 150. Actuating the separate switch (for example when the vehicle is in an off road application) causes LEDs 150 to emit white light. LEDs 150 may be energized using the vehicle power or supplemental power. The circuit shown in FIG. 3a may be placed in several different states as more clearly described above. Thus, for example, the circuit shown in FIG. 3a can be switched from a) a first state where amber LED's 151 are on (by switching switch SW1—as shown switch SW1 can optionally be the vehicle headlight switch) and white LEDs 150 are off; to b) a second state where amber LED's 151 are on and white LEDs 150 are on (by switching switch SW2). As explained above, in some embodiments, it is possible to provide the circuit shown in FIG. 3a and to place that circuit in other states.

Figure 3B:
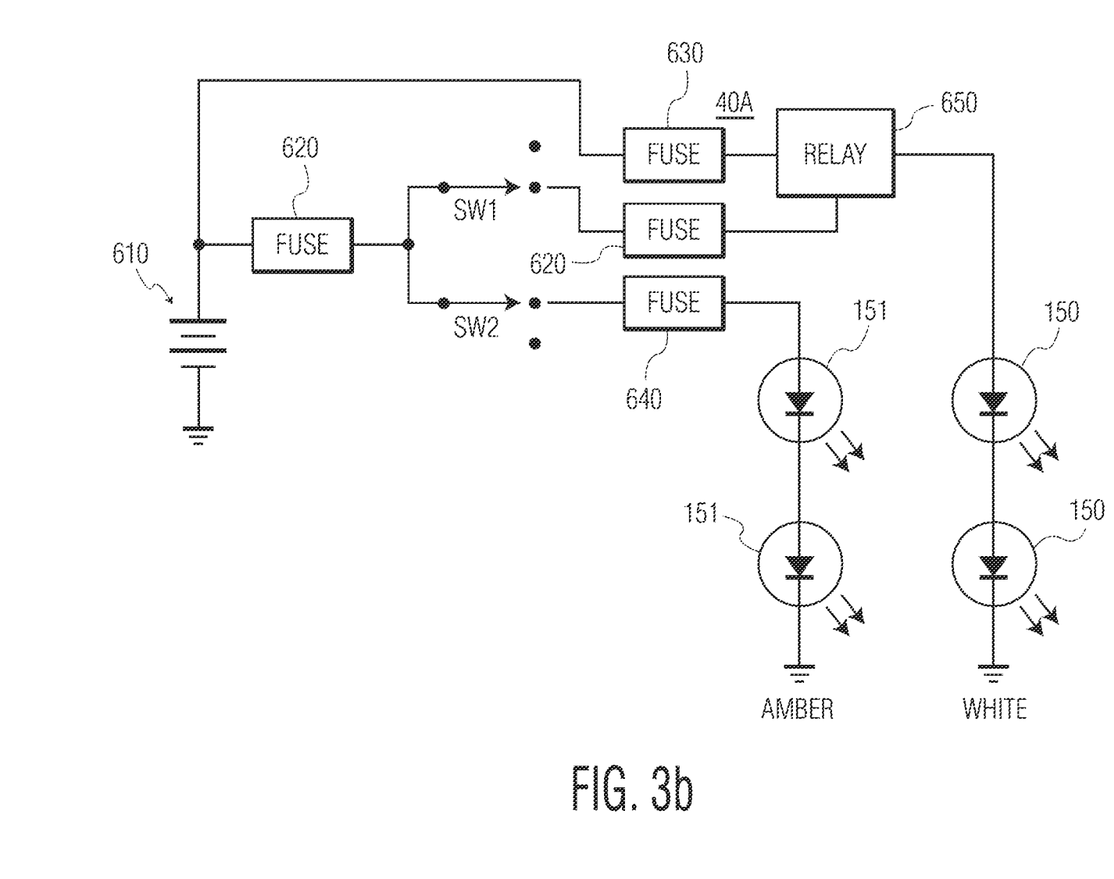
FIG. 3b is a schematic diagram showing connections between the LEDs, switches and power supply.

FIG. 3b is a further exemplary schematic diagram which illustrates one option for powering the LEDs. Power source 610 may be a vehicle's battery (or an enhanced battery system). Fuses 620, 630 and 640 may be included. The fuse values shown in FIG. 3b are merely exemplary. If LEDs 150 are 10 watt LEDs, it is possible that LEDs 150 are drawing 30 amps of current (or more). Therefore, relay 650 may be included. Switch SW1 may be, for example, the existing headlight switch in the vehicle or an additional switch. Switch SW2 is an additional switch. The circuit shown in FIG. 3b may be placed in several different states as more clearly described above. Thus, for example, the circuit shown in FIG. 3b can be switched from a) a first state where amber LEDs 151 are on (by switching switch SW1—as shown switch SW1 can optionally be the vehicle headlight switch) and white LEDs 150 are off; to b) a second state where amber LEDs 151 are on and white LEDs 150 are on (by switching switch SW2). As explained above, in some embodiments, it is possible to provide the circuit shown in FIG. 3b and to place that circuit in other states.

The source of power used to energize LEDs 150 and LEDs 151 may be the same, or may be different. Alternatively, a vehicle battery can be supplemented with a second battery so that LEDs 150 can emit light for a longer period of time than with a single battery.

Also, it is noted that it is possible (and in fact typical) that when LEDs 150 are emitting light, LEDs 151 are also emitting light. The light emitted from amber LEDs 151 will typically not be visible because those LEDs will be overpowered by the light being emitted from white LEDs 150.

Figure 4:
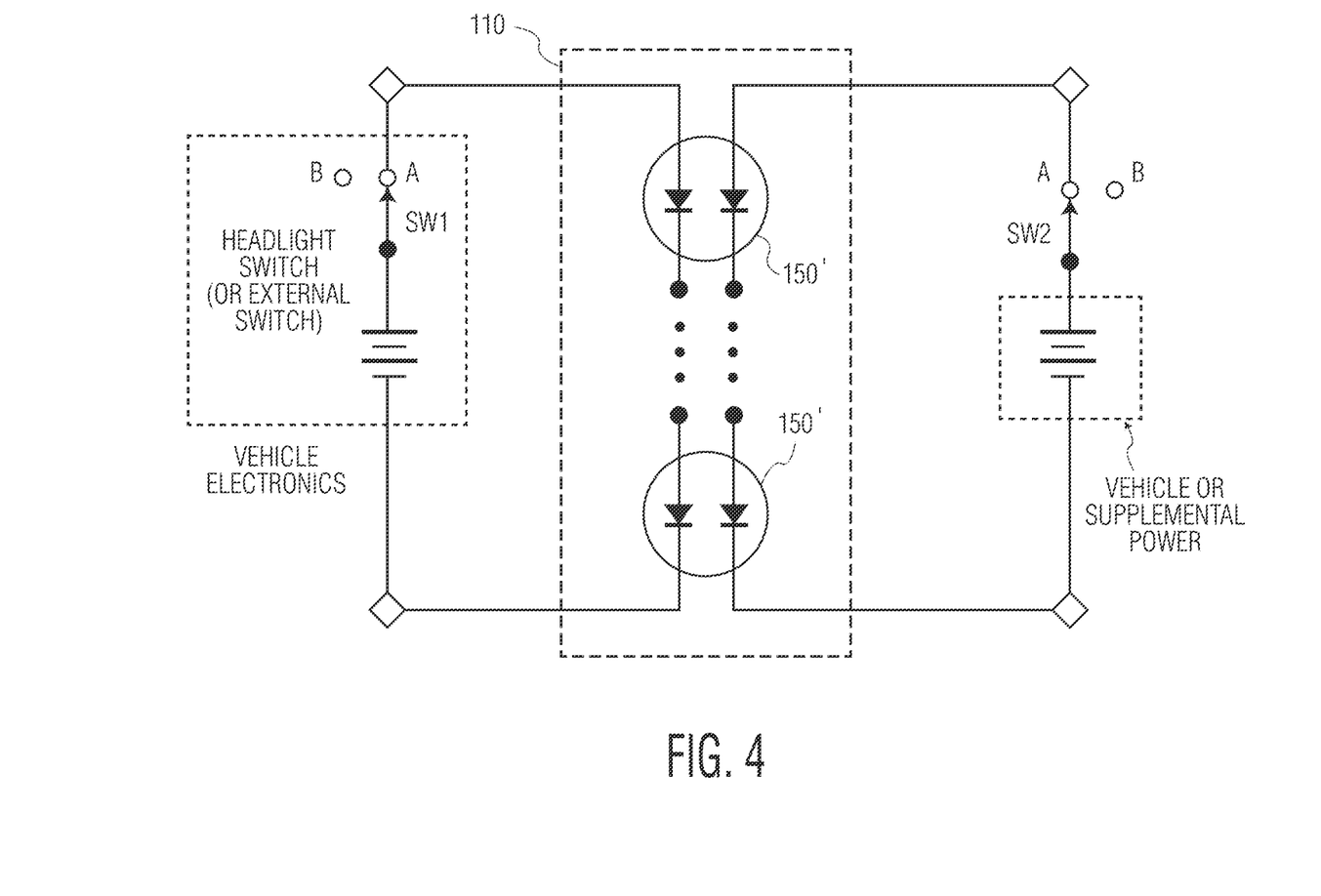
FIG. 4 is schematic diagram for powering dual color LEDs in accordance with an exemplary embodiment of the present invention.

In a further exemplary embodiment of the present invention, dual color LEDs are used. Dual color LEDs each include two diodes that emit light in respectively different colors. Furthermore, dual color LEDs each include two respective anodes for allowing voltage to be applied to each diode. FIG. 4 is a schematic which illustrates an exemplary embodiment of the present invention which uses dual color LEDs. In the embodiment of FIG. 4, white LED 150 and amber LED 151 within module 140 have been replaced with dual color LED 150'. When switch SW1 is in position A, LEDs 150' emit amber light. When switch SW2 is in position A, LEDs 150' emit white light.

The above explanations describe exemplary embodiments of the present invention in which the LEDs are arranged in a single row. It is understood, however, that the LEDs may be arranged in multiple rows. It is also understood that amber light may be emitted from one row(s) and not others and white light may be emitted from one row(s) and not others.

While portions 131 have been described as not including amber LEDs 151, it is also understood that amber LEDs might be in portions 131 and simply not energized.

While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The invention claimed is:

1. A light emitting diode (LED) light bar for a vehicle, comprising:
    a housing not integrated with the vehicle;
    a plurality of reflectors in a row located within said housing;
    a mount for mounting said housing onto a vehicle so that said reflectors reflect light forward of said vehicle;
    a first plurality of LEDs having light reflected by ones of said plurality of reflectors, respectively, wherein each of said plurality of reflectors surrounds a respective one of said first plurality of LEDs with reflective material, and wherein said ones of said plurality of reflectors are adjacent to each other;
    a second plurality of LED groups, each of said LED groups having multiple LEDs, said multiple LEDs in each of said LED groups arranged in multiple rows, each of said LED groups having light reflected by reflective material included in a respective one of said plurality of reflectors;
    in each respective one of said plurality of reflectors, reflective material is between each first plurality of LEDs and each second plurality of LED groups;
    said first plurality of LEDs electrically connected together for illuminating light together responsive to receipt of electrical current from a cable entering said housing from outside of said housing wherein said plurality of reflectors are located;
    said second plurality of multiple LED groups electrically connected together for illuminating light together responsive to receipt of electrical current from outside of said housing wherein said plurality of reflectors are located and independently of said first plurality of LEDs receiving electrical current; and said first plurality of LEDs electrically connected together independently of said second plurality of LED groups for independent energizing of said first plurality of LEDs relative to said second plurality of LED groups wherein relative to each common one of said reflectors, each one of said first plurality of LEDs emit light from a different location than from where each one of said second plurality of LED groups emit light, and each of said second plurality of LED groups emits light from around each respective one of said first plurality of LEDs; and each of said reflectors including a back end where each of said respective first plurality of LEDs are located and a front end forward of said back end where light from each of said first plurality of LEDs exits said reflectors, wherein for each respective one of said plurality of reflectors, said second plurality of LED groups are mounted closer to said front end than said first plurality of LEDs are mounted.

2. A light emitting diode (LED) light bar according to claim 1, wherein said first LEDs emit light having a first color, said second plurality of multiple LED groups emit light having a second color, and said first color and said second color are different.

3. A light emitting diode (LED) light bar according to claim 1, wherein said first plurality of LEDs emit light with a first power level and said second plurality of multiple LED groups emit light with a second power level different than the first power level.

4. A light emitting diode (LED) light bar according to claim 1, further comprising a switch for electrically connecting said second plurality of multiple LED groups to electrical current independently of said first plurality of LEDs receiving electrical current.

5. A light emitting diode (LED) light bar according to claim 1, wherein at least one of said first plurality of LEDs and said second plurality of multiple LED groups are coupled to an oscillator for causing at least one of said first plurality of LEDs and said second plurality of multiple LED groups to pulse when energized.

6. A light emitting diode (LED) light bar according to claim 1, wherein in each common one of said reflectors, each one of said first plurality of LEDs and second plurality of multiple LED groups are positioned within respectively separate openings in each common one of said reflectors.

7. A light emitting diode (LED) bar according to claim 6, wherein said first diode and said second group of diodes respectively emit light in two different power levels.

8. A light emitting diode (LED) light bar according to claim 1, wherein in a first mode said second plurality of multiple LED groups produce light, and in a second mode said first plurality of LEDs produce light and have an appearance that is different than in said first mode that is selected from the group consisting of a) different color; b) different power level; c) different illumination pattern; d) different illumination duration; and e) different flashing intervals.

9. A light emitting diode (LED) light bar according to claim 1, wherein said first plurality of LEDs electrically connected together independently of said second plurality of LED groups for independent energizing of said first plurality of LEDs relative to said second plurality of LED groups so that said light bar is switchable between three states: 1) a first state in which said first plurality of LEDs are off and said second plurality of LED groups are off; 2) a second state in which said first plurality of LEDs are on and said second plurality of LED groups are off; and 3) a third state in which said first plurality of LED's are on and said second plurality of LED groups are on.

10. A light emitting diode (LED) light bar according to claim 1, wherein in each of said reflectors, said reflective material between each of said respective first plurality of LEDs and said second plurality of LED groups extends from each of said respective first plurality of LEDs, toward said front end, and to each of said second plurality of LED groups around each respective one of said first plurality of LEDs.

11. A light emitting diode (LED) light bar according to claim 10, wherein said second plurality of LED groups are above a printed circuit board that receives said electrical current.

12. A light emitting diode (LED) bar for a vehicle, comprising:
a housing;
a plurality of LEDs, said LEDs including a row of first diodes and multiple rows of a second group of diodes that respectively emit light of one of the following:
two different colors,
two different power levels,
two different colors and two different power levels,
each pair of:
a) a respective one of said first diodes and b) ones of said second group of diodes in said multiple rows
having light reflected by a respective reflector, wherein one of said multiple rows is above the first diodes, another of said multiple rows below the first diodes, and in each respective reflector, reflective material is between a respective one of the first diodes and a respective one of the second group of diodes;
said first diodes of each of said LEDs electrically connected together;
said second group of diodes of each of said LEDs electrically connected together independently of said first diode of each of said LEDs;
said first diodes and said second group of diodes relative to each respective reflector emit light from respectively different locations, with said second group of diodes emitting light from said multiple rows relative to said first diodes while said first diodes in each reflector are electrically connected together and electrically connected together independently of said second group of diodes in each reflector for energizing of said first diodes responsive to receipt of electrical current from a cable entering said housing from outside said housing in which said plurality of reflectors are located, and for energizing of said first diodes independently of said second group of diodes that are energized from outside of said housing in which said plurality of reflectors are located and from said respectively different locations;
each respective reflector having a back end where said respective one of said first diodes is located and a front end forward of said hack end where light from said respective one of said first diodes exits each respective reflector, and wherein for each respective reflector said second group of diodes are mounted closer to said front end than said respective one of said first diodes is mounted.

13. A light emitting diode (LED) light bar according to claim 12, further comprising a switch for electrically connecting said second group of diodes to electrical current independently of said first diode receiving electrical current.

14. A light emitting diode (LED) bar according to claim 12, wherein in each respective reflector, said first diode and said second group of diodes are positioned within respectively separate openings.

15. A light emitting diode (LED) bar according to claim 12, wherein said first diode and said second group of diodes respectively emit light in two different colors.

16. A light emitting diode (LED) bar according to claim 12, wherein said first diode and said second group of diodes respectively emit light in two different colors and two different power levels.

17. A light emitting diode (LED) light bar according to claim 12, wherein in a first mode said second group of diodes produces light and in a second mode said first diode produces light and has an appearance that is different than in said first mode that is selected from the group consisting of a) different color; b) different power level; c) different illumination pattern; d) different illumination duration; and e) different flashing intervals.

18. A light emitting diode (LED) light bar according to claim 12, wherein in said respective reflector, said reflective material between said respective one of said first diodes and said ones of said second group of diodes extends from said respective one of said first diodes, toward said front end, and to said ones of said second group of diodes.

19. A light emitting diode (LED) light bar according to claim 18, wherein said second group of diodes are above a printed circuit board that receives said electrical current.

* * * * *